United States Patent
Tsirkin et al.

(10) Patent No.: US 9,639,388 B2
(45) Date of Patent: May 2, 2017

(54) DEFERRED ASSIGNMENT OF DEVICES IN VIRTUAL MACHINE MIGRATION

(71) Applicant: Red Hat Israel, Ltd., Raanana (IL)

(72) Inventors: Michael Tsirkin, Yokneam Yillit (IL); Stephen Tweedie, Edinburgh (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/870,785

(22) Filed: Sep. 30, 2015

(65) Prior Publication Data
US 2017/0090968 A1    Mar. 30, 2017

(51) Int. Cl.
| G06F 9/455 | (2006.01) |
| G06F 3/06 | (2006.01) |
| G06F 13/42 | (2006.01) |
| G06F 13/40 | (2006.01) |

(52) U.S. Cl.
CPC ........ *G06F 9/45558* (2013.01); *G06F 3/0604* (2013.01); *G06F 3/065* (2013.01); *G06F 3/0664* (2013.01); *G06F 3/0673* (2013.01); *G06F 13/404* (2013.01); *G06F 13/4234* (2013.01); *G06F 2009/4557* (2013.01); *G06F 2009/45579* (2013.01); *G06F 2009/45583* (2013.01)

(58) Field of Classification Search
CPC .................................................. G06F 9/45533
USPC ............................................................ 718/1
See application file for complete search history.

(56) References Cited

U.S. PATENT DOCUMENTS

| 7,788,665 | B2 | 8/2010 | Oshins | |
| 8,086,821 | B2 | 12/2011 | Mukherjee et al. | |
| 8,146,082 | B2 | 3/2012 | Belay | |
| 8,533,713 | B2 | 9/2013 | Dong | |
| 8,924,965 | B2 | 12/2014 | Tsirkin et al. | |
| 2009/0007099 | A1 | 1/2009 | Cummings et al. | |
| 2009/0119663 | A1* | 5/2009 | Mukherjee | .......... G06F 12/1081 718/1 |
| 2011/0084973 | A1* | 4/2011 | Masood | .................. G06F 9/455 345/506 |
| 2012/0042034 | A1* | 2/2012 | Goggin | .................. G06F 9/4856 709/216 |
| 2012/0179855 | A1 | 7/2012 | Tsirkin et al. | |

OTHER PUBLICATIONS

Gordon, Abel et al. "Toward Exitless and Efficient Paravirtual I/O", IBM Research—Haifa, Jun. 4-6, 2012, Haifa, Israel, 6 pages http://www.mulix.org/pubs/eli/elvis-systor12.pdf.

(Continued)

*Primary Examiner* — Andy Ho
(74) *Attorney, Agent, or Firm* — Lowenstein Sandler LLP

(57) ABSTRACT

Systems and methods for deferred assignment of devices in virtual machine migration. An example method comprises: starting, by a processing device of a first host computer system, a virtual machine being migrated from a second host computer system in a post-copy migration mode; receiving a request to associate an input/output (I/O) device with the virtual machine; and responsive to receiving, from the second host computer system, one or more memory pages comprised by a memory buffer associated with the I/O device, performing at least one of: associating an identifier of the I/O device with the memory buffer or allowing the virtual machine to access the I/O device.

20 Claims, 4 Drawing Sheets

(56) References Cited

OTHER PUBLICATIONS

Hirofuchi, Takahiro et al., "Yabusame: Postcopy Live Migration for QEMU/KVM", National Institute of Advanced Industrial Science and Technology; VALinux Systems Japan K.K., KVM Forum 2011 30 pages http://www.linux-kvm.org/images/e/ed/2011-forum-yabusame-postcopy-migration.pdf.

Perez-Botero, Diego, "A Brief Tutorial on Live Virtual Machine Migration From a Security Perspective", Princeton University, Princeton, NJ 8 pages http://www.cs.princeton.edu/~diegop/data/580_midterm_project.pdf.

Rizzo, Luigi et al., "Speeding Up Packet I/O in Virtual Machines", Universita di Pisa, Italy, IEEE 2013 pp. 47-58 http://www.computer.org/csdl/proceedings/ancs/2013/9999/00/06665175.pdf.

\* cited by examiner

DEFERRED ASSIGNMENT OF DEVICES IN VIRTUAL MACHINE MIGRATION

TECHNICAL FIELD

The present disclosure is generally related to virtualized computer systems, and is more specifically related to systems and methods for facilitating virtual machine migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
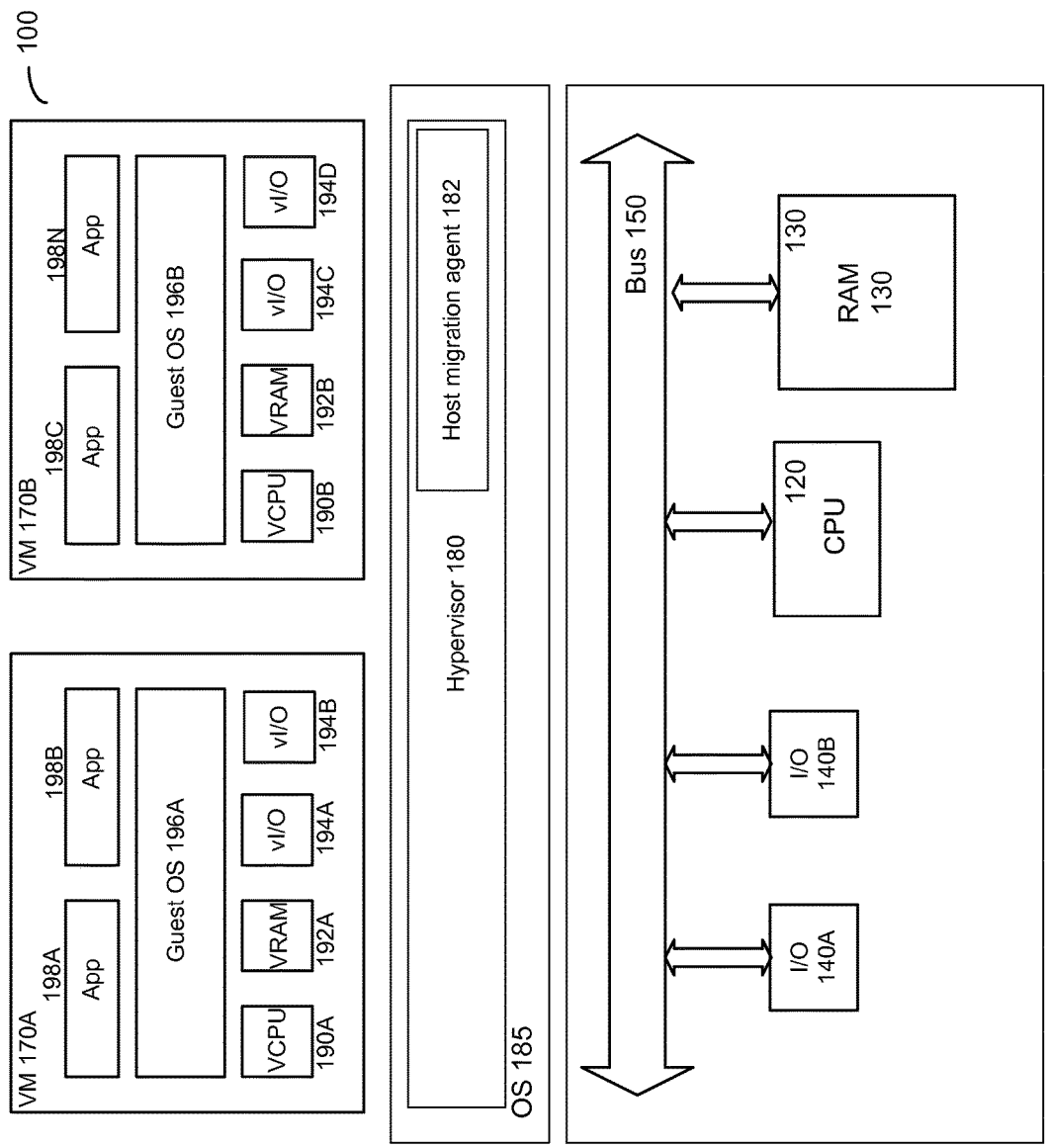
FIG. 1 depicts a high-level component diagram of an example computer system implementing the methods for deferred assignment of devices in virtual machine migration, in accordance with one or more aspects of the present disclosure.

Described herein are methods and systems for deferred assignment of devices in virtual machine live migration.

"Virtual machine live migration" herein refers to the process of moving a running virtual machine from an origin host computer system to a destination host computer system without disrupting the guest operating system and/or the applications executed by the virtual machine. In certain implementations, a migration agent may pre-copy a subset of the execution state of the virtual machine being migrated from the origin host to the destination host while the virtual machine is still running at the origin host. Upon completing the state pre-copying operation, the migration agent may switch to a post-copy migration method, by stopping the virtual machine, optionally transferring a subset of the virtual machine execution state (including the virtual processor state and non-pageable memory state) to the destination host, resuming the virtual machine at the destination host, generating a page fault responsive to detecting the virtual machine's attempt to access a memory page which has not yet been transferred, and transferring the page from the origin host to the destination host responsive to the page fault. In certain implementations, the post-copy migration stage may be initiated without pre-copying a subset of the execution state of the virtual machine.

While the post-copy migration method may significantly improve the migration process duration and overall efficiency, such a migration method would not work for migrating virtual machines supporting Direct Memory Access (DMA) by I/O devices.

DMA herein refers to a method allowing an I/O device to access the system memory directly, while bypassing the central processing unit (CPU). I/O devices that are capable of performing DMA may include disk drive controllers, graphics cards, network interface cards, sound cards, etc. In certain implementations, a host computer system may emulate DMA to allow virtual I/O devices to access the guest memory directly, while bypassing the guest central processing units (vCPUs). A hypervisor running on the host computer system may emulate a guest I/O table (e.g., a guest Input/Output Memory Management Unit (IOMMU)) to manage address translations for DMA-enabled virtual I/O devices.

Thus, the post-copy migration method would not work for migrating virtual machines supporting DMA by I/O devices, since such a migration method relies upon the page fault mechanism, while I/O devices don't normally trigger page faults, and furthermore, may not tolerate page faults due to the real-time nature of I/O request processing.

Aspects of the present disclosure address the above noted and other deficiencies by providing methods and systems for deferred assignment of devices in virtual machine live migration. In accordance with one or more aspects of the present disclosure, the destination hypervisor may start a virtual machine being migrated in the post-copy migration mode. Responsive to receiving a request to associate an input/output (I/O) device with the virtual machine, the destination hypervisor may ascertain that all memory pages comprised by a memory buffer associated with the I/O device have been successfully migrated to the destination host.

Responsive to ascertaining that all memory pages comprised by a memory buffer associated with the I/O device have been successfully migrated to the destination host, the destination hypervisor may create or modify an entry in the guest I/O table (e.g., in the guest IOMMU) to associate the I/O device identifier with the memory buffer. The destination hypervisor may then allow the virtual machine to access the I/O device and notify the virtual machine of the presence of the I/O device.

In certain implementations, the destination hypervisor may accelerate the migration of the memory buffer associated with the I/O device, by identifying and pre-copying the memory pages used by the I/O device. Responsive to receiving a request from the virtual machine to grant to the I/O device access to an additional memory page, the destination hypervisor may migrate the requested memory page to the destination host.

Various aspects of the above referenced methods and systems are described in details herein below by way of examples, rather than by way of limitation.

FIG. 1 depicts a high-level component diagram of an illustrative example of a host computer system 100 operating in accordance with one or more aspects of the present disclosure. Host computer system 100 may include one or more processors 120 communicatively coupled to memory devices 130 and input/output (I/O) devices 140 via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Host computer system 100 may run one or more virtual machines 170A-170B, by executing a software layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170A-170B as virtual devices. A virtual machine 170 may execute a guest operating system 196 which may utilize underlying virtual processors (also referred to as virtual central processing units (vCPUs)) 190, virtual memory 192, and virtual I/O devices 194. One or more applications 198A-198N may be running on a virtual machine 170 under a guest operating system 196.

In various illustrative examples, processor virtualization may be implemented by the hypervisor scheduling time slots on one or more physical processors for a virtual machine, rather than a virtual machine actually having a dedicated physical processor. Device virtualization may be implemented by intercepting virtual machine memory read/write and/or input/output (I/O) operations with respect to certain memory and/or I/O port ranges, and by routing hardware interrupts to a virtual machine associated with the corresponding virtual device. Memory virtualization may be implementing by a paging mechanism allocating the host RAM to virtual machine memory pages and swapping the memory pages to a backing storage when necessary. Host computer system 100 may support a virtual memory environment in which a virtual machine address space is simulated with a smaller amount of the host random access memory (RAM) and a backing storage (e.g., a file on a disk or a raw storage device), thus allowing the host to overcommit the memory. The virtual machine memory space may be divided into memory pages which may be allocated in the host RAM and swapped to the backing storage when necessary. The guest operating system may maintain a page directory and a set of page tables to keep track of the memory pages. When a virtual machine attempts to access a memory page, it may use the page directory and page tables to translate the virtual address into a physical address. If the page being accessed is not currently in the host RAM, a page-fault exception may be generated, responsive to which the host computer system may read the page from the backing storage and continue executing the virtual machine that caused the exception.

In certain implementations, the host computer system may emulate Direct Memory Access (DMA) to allow virtual I/O devices to access the guest memory directly, while bypassing the guest central processing units (CPUs). A hypervisor running on the host computer system may emulate a guest I/O table (e.g., a guest IOMMU) to manage address translations for DMA-enabled virtual I/O devices. The guest IOMMU may map an I/O device identifier (comprising an I/O bus identifier and a device address) to a guest physical address of the memory buffer that has been allocated to the device by the guest operating system.

Figure 2:
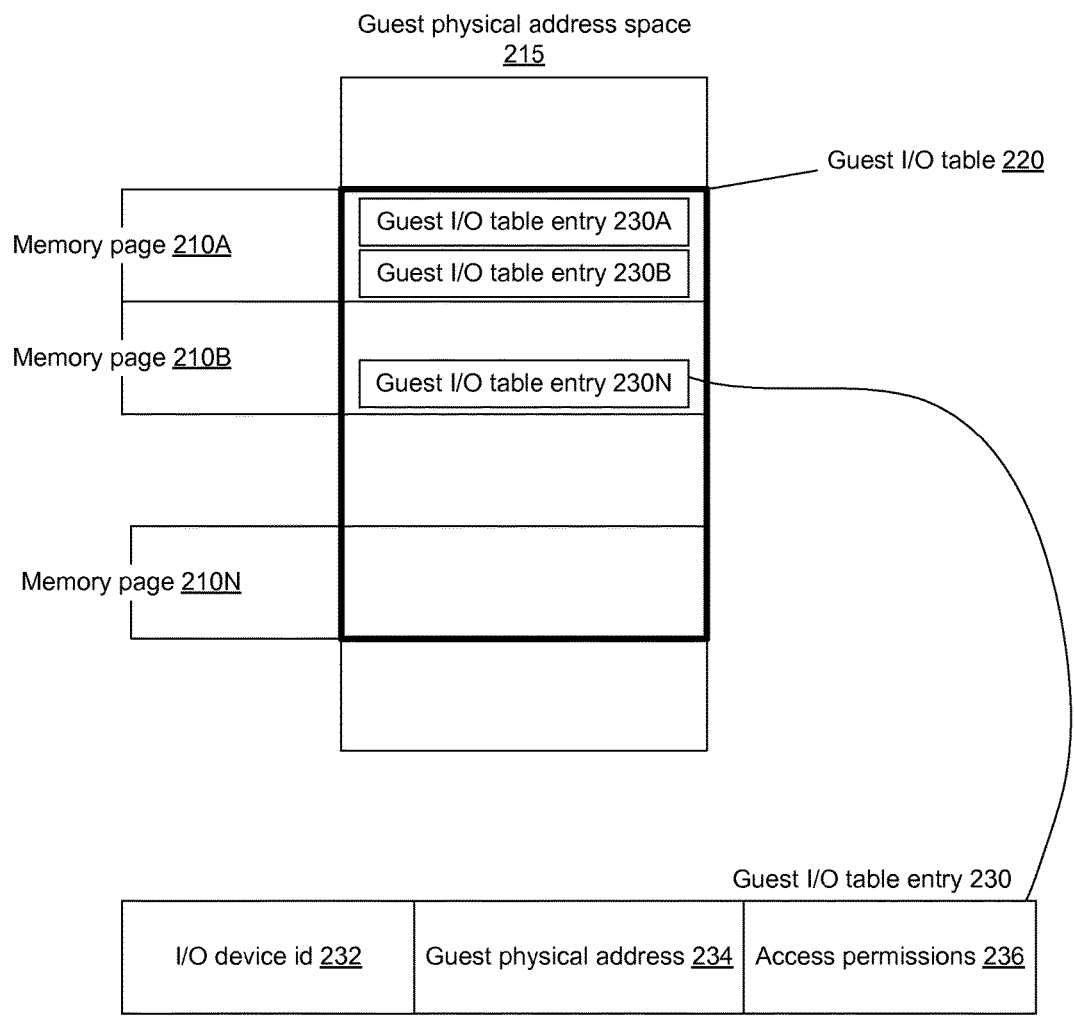
FIG. 2 schematically illustrates an example of guest I/O table, in accordance with one or more aspects of the present disclosure.

FIG. 2 schematically illustrates an example of guest I/O table, in accordance with one or more aspects of the present disclosure. As schematically illustrated by FIG. 2, the hypervisor may allocate a plurality of memory pages 210A-210N residing in the guest memory 215 to store a guest I/O table 220. In an illustrative example, guest I/O table 220 may be represented by an emulated IOMMU. Guest I/O tables may comprise a plurality of I/O table entries 230A-230N. A guest table entry 230 may map an I/O device identifier 232 to a guest physical address 234 of the memory buffer associated with the I/O device. In certain implementations, I/O device identifier 232 may comprise an I/O bus identifier and a device address on the bus. In certain implementations, guest table entry 230 may further comprise access permissions 236 associated with the memory buffer.

In an illustrative example, host computer system 100 depicted in FIG. 1 may act as a destination host for migrating virtual machine 170A. Live migration may involve copying the virtual machine execution state from the origin host to the destination host. The virtual machine execution state may comprise the memory state, the virtual processor state, the virtual devices state, and/or the connectivity state.

Hypervisor 180 may include a host migration agent 182 designed to perform at least some of the virtual machine migration management functions in accordance with one or more aspects of the present disclosure. In certain implementations, host migration agent 182 may be implemented as a software component invoked by hypervisor 180. Alternatively, functions of host migration agent 182 may be performed by hypervisor 180.

In an illustrative example, host migration agent 182 may copy, over a network, the execution state of virtual machine 170A, including a plurality of memory pages, from an origin host (not shown in FIG. 1) to destination host 100 without disrupting the guest operating system and/or the applications executed by the virtual machine.

In certain implementations, host migration agent 182 may pre-copy a subset of the execution state of the virtual machine being migrated from the origin host to destination host 100 while virtual machine 170A is still running at the origin host. Upon completing the state pre-copying operation, host migration agent 182 may switch to a post-copy migration stage. In certain implementations, the post-copy migration stage may be initiated without pre-copying a subset of the execution state of the virtual machine.

During the post-copying migration stage, host migration agent 182 may stop virtual machine 170A, optionally transfer a subset of the virtual machine execution state (including the virtual processor state and non-pageable memory state) to the destination host, and then resume the virtual machine at the destination host.

In the subsequent operation, hypervisor 180 may, responsive to detecting an attempt by virtual machine 170A to access a memory page the contents of which has not yet been transferred from the origin host, generate a page fault. Responsive to the page fault, host migration agent 182 may cause the contents of the memory page to be transmitted by the origin host to destination host 100.

As noted herein above, the post-copy migration method would not work for migrating virtual machines supporting DMA by I/O devices, since such a migration method relies upon the page fault mechanism, while I/O devices don't normally trigger page faults, and furthermore, may not tolerate page faults due to the real-time nature of I/O request processing.

Aspects of the present disclosure address the above noted and other deficiencies by providing methods and systems for deferred assignment of devices in virtual machine live migration. In accordance with one or more aspects of the present disclosure, hypervisor 180 may initiate the post-copy migration stage of virtual machine 170A by starting the virtual machine on destination host computer system 100.

Responsive to receiving a request to associate an input/output (I/O) device with running virtual machine 170, hypervisor 180 may determine whether the contents of all memory pages comprised by the memory buffer associated with the I/O device have been successfully migrated to destination host computer system 100.

In certain implementations, responsive to determining that the contents of the memory buffer associated with the I/O device has not yet been completely migrated to destination host computer system 100, hypervisor 180 may provide, to virtual machine 170A, an emulated or a para-virtualized I/O device interface to the physical I/O device that is being associated with virtual machine 170A, as an interim arrangement for the duration of the process of migrating the memory buffer associated with the I/O device.

In certain implementations, in order to accelerate the migration of the memory buffer associated with the I/O device, hypervisor 180 may identify and pre-copy the memory pages used by the I/O device. Responsive to eventually receiving a request from virtual machine 170A to grant to the I/O device access to an additional memory page, hypervisor 180 may cause the contents of the memory page to be transmitted by the origin host to destination host 100.

Responsive to ascertaining that the contents of the memory buffer to be associated with the I/O device has been successfully migrated to destination host computer system 100, hypervisor 180 may create or modify an entry in the guest I/O table (e.g., in the guest IOMMU) to associate the I/O device identifier with the memory buffer, as described in more details herein above with reference to FIG. 2. Hypervisor 180 may then allow virtual machine 170A to access the I/O device and notify virtual machine 170A of the presence of the I/O device.

Figure 3:
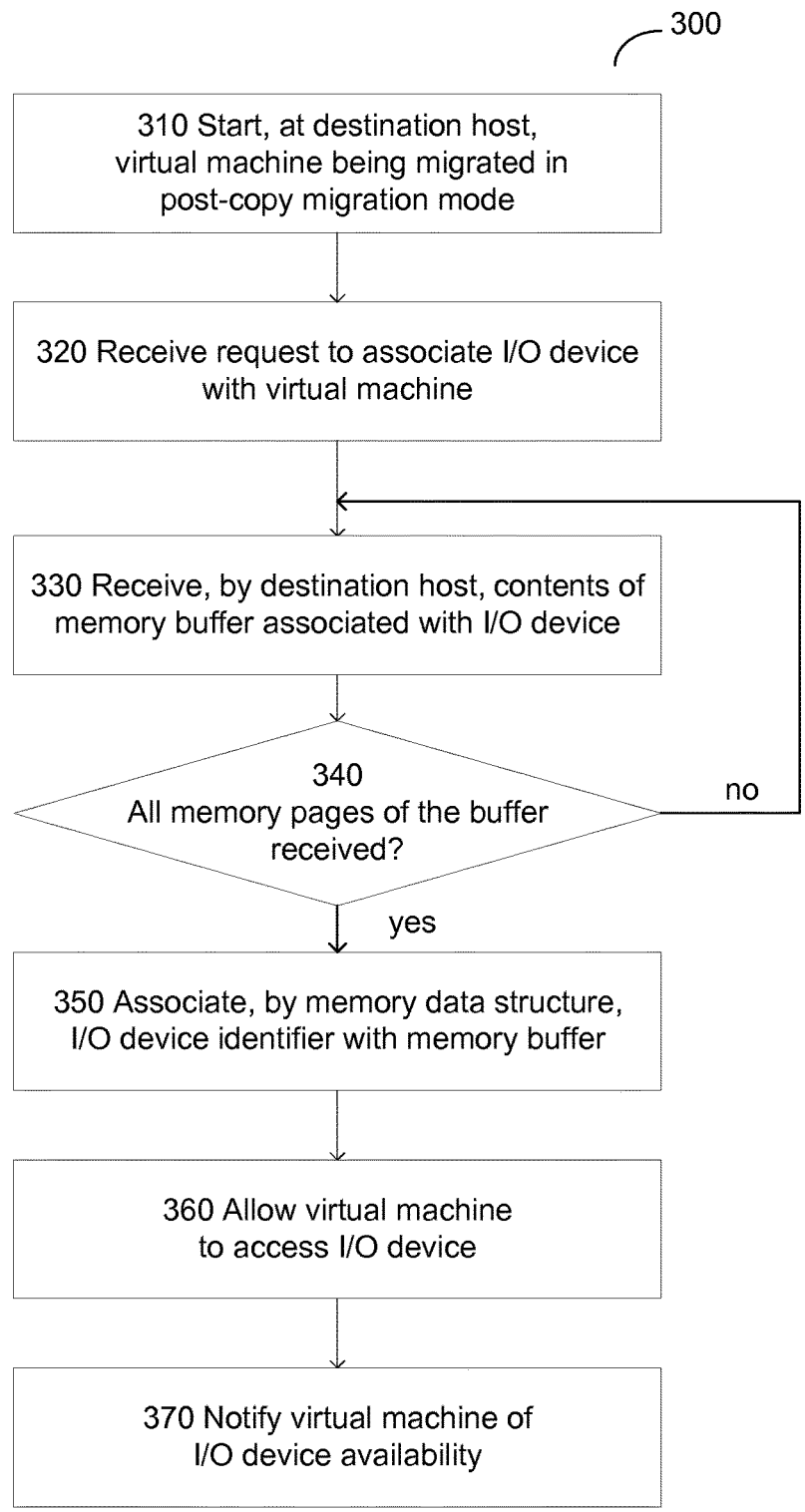
FIG. 3 depicts a flow diagram of a method for deferred assignment of devices in virtual machine migration, in accordance with one or more aspects of the present disclosure.

FIG. 3 depicts a flow diagram of one illustrative example of method 300 for deferred assignment of devices in virtual machine migration, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device of a host computer system implementing the method may initiate the post-copy migration stage of a virtual machine by starting the virtual machine, as described in more details herein above.

At block 320, the processing device may receive a request to associate an input/output (I/O) device with the running virtual machine, as described in more details herein above.

At block 330, the processing device may the contents of the memory buffer to be associated with the I/O device, as described in more details herein above. In an illustrative example, the processing device may receive all memory pages comprised by the memory buffer. Alternatively, the processing device may receive a subset of memory pages comprised by the memory buffer.

Responsive to determining, at block 340, that the contents of the memory buffer to be associated with the I/O device has been successfully migrated to the host computer system, the processing device may, at block 350, create or modify an entry in the guest I/O table (e.g., in the guest IOMMU) to associate the I/O device identifier with the memory buffer, as described in more details herein above with reference to FIG. 2.

At block 360, the processing device may allow the virtual machine to access the I/O device, as described in more details herein above.

At block 370, the processing device may notify the virtual machine of the presence of the I/O device, as described in more details herein above.

Responsive to completing the operations described with reference to block 380, the method may terminate.

Figure 4:
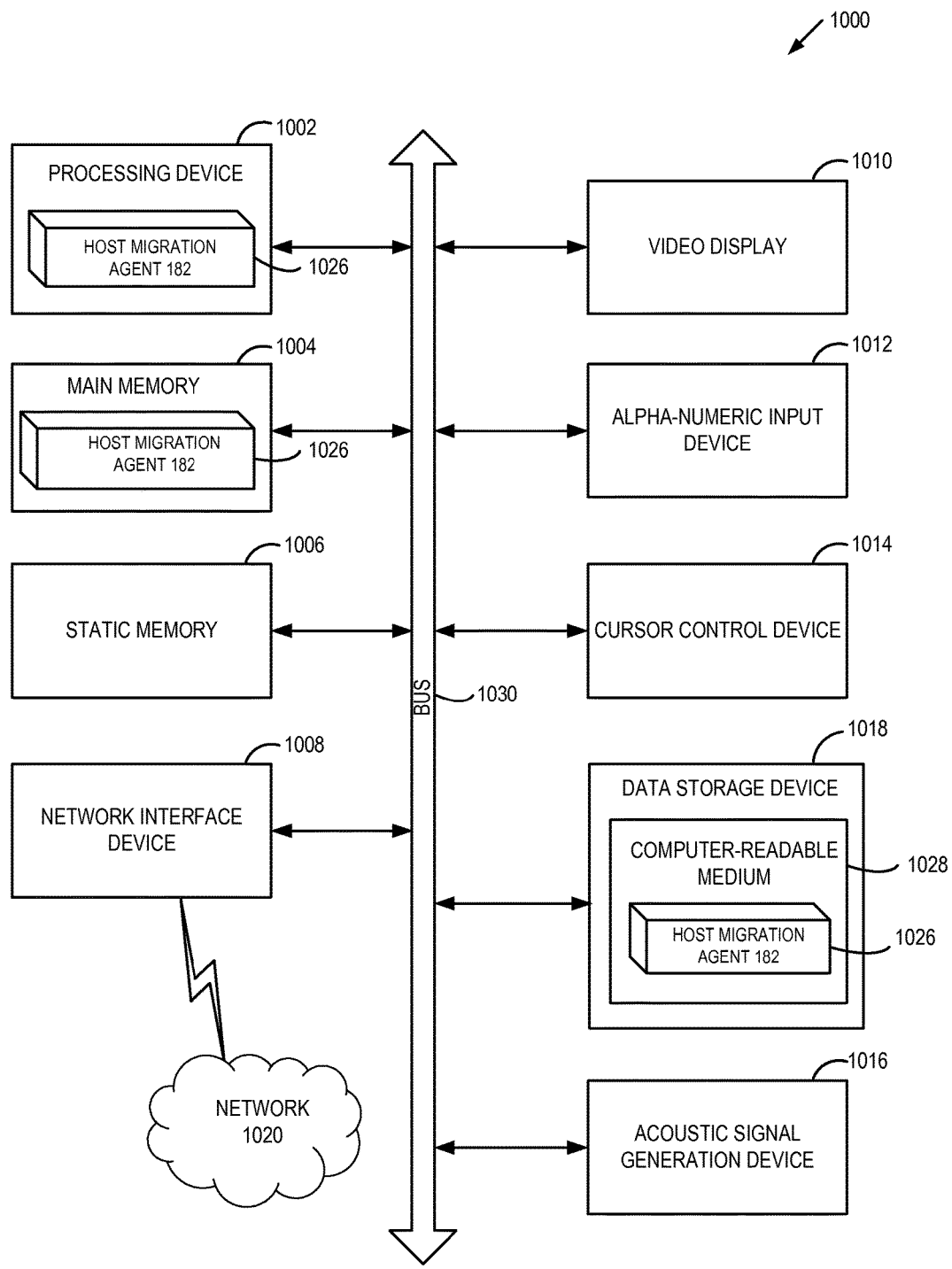
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006

(e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute host migration agent 182 implementing method 300 for deferred assignment of devices in virtual machine migration.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of host migration agent 182 implementing method 300 for deferred assignment of devices in virtual machine migration.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:

starting, by a processing device of a first host computer system, a virtual machine being migrated from a second host computer system in a post-copy migration mode;

receiving a request to associate an input/output (I/O) device with the virtual machine; and responsive to receiving, by the processing device, from the second host computer system, one or more memory pages comprised by a memory buffer associated with the I/O device, associating an identifier of the I/O device with the memory buffer.

2. The method of claim 1, wherein the received memory pages represent all memory pages comprised by the memory buffer associated with the I/O device.

3. The method of claim 1, wherein the received memory pages represent a subset of memory pages comprised by the memory buffer associated with the I/O device.

4. The method of claim 1, wherein associating the identifier of the I/O device with the memory buffer is performed by modifying an entry of a guest I/O table.

5. The method of claim 4, wherein the guest I/O table is represented by an Input/Output Memory Management Unit (IOMMU) table.

6. The method of claim 1, wherein the identifier of the I/O device comprises at least one of a bus identifier or a bus address.

7. The method of claim 1, wherein the I/O device is represented by a physical I/O device associated with the virtual machine.

8. The method of claim 1, further comprising:

notifying the virtual machine of the I/O device.

9. The method of claim 1, wherein receiving one or more memory pages comprised by the memory buffer further comprises:

identifying at least a subset of memory pages used by the I/O device; and causing the identified memory pages to be copied to the first host computer system.

10. The method of claim 9, wherein receiving one or more memory pages comprised by the memory buffer further comprises:

receiving a request from the virtual machine to grant to the I/O device access to an additional memory page; and causing the additional memory page to be copied to the first host computer system.

11. A first computer system, comprising:

a memory; and a processing device, operatively coupled to the memory, to:

start a virtual machine being migrated from a second computer system in a post-copy migration mode;

receive a request to associate an input/output (I/O) device with the virtual machine; and responsive to receiving, from the second computer system, one or more memory pages comprised by a memory buffer associated with the I/O device, allowing the virtual machine to access the I/O device.

12. The system of claim 11, wherein the received memory pages represent all memory pages comprised by the memory buffer associated with the I/O device.

13. The system of claim 11, wherein the received memory pages represent a subset of memory pages comprised by the memory buffer associated with the I/O device.

14. The system of claim 11, wherein to associate the identifier of the I/O device with the memory buffer, the processing device is to modify an entry of a guest I/O table.

15. The system of claim 14, wherein the guest I/O table is represented by an Input/Output Memory Management Unit (IOMMU) table.

16. The system of claim 11, wherein the identifier of the I/O device comprises at least one of a bus identifier or a bus address.

17. The system of claim 11, wherein the I/O device is represented by a physical I/O device associated with the virtual machine.

18. The system of claim 11, wherein the processing device is further to:

notify the virtual machine of the I/O device.

19. A computer-readable non-transitory storage medium comprising executable instructions to cause a processing device of a first host computer system to:

start, by the processing device, a virtual machine being migrated from a second host computer system in a post-copy migration mode;

receive a request to associate an input/output (I/O) device with the virtual machine; and responsive to receiving, by the processing device, from the second host computer system, one or more memory pages comprised by a memory buffer associated with the I/O device, associating an identifier of the I/O device with the memory buffer and allowing the virtual machine to access the I/O device.

20. The computer-readable non-transitory storage medium of claim 19, wherein the received memory pages represent at least a subset of memory pages comprised by the memory buffer associated with the I/O device.

* * * * *